(12) United States Patent
Wachenheim et al.

(10) Patent No.: US 8,165,734 B2
(45) Date of Patent: Apr. 24, 2012

(54) METHOD AND DEVICE FOR GUIDING AN AIRCRAFT

(75) Inventors: Maxime Wachenheim, Toulouse (FR); Jean-Louis De Menorval, Aussonne (FR); Sylvain Raynaud, Cornebarrieu (FR)

(73) Assignee: Airbus Operations SAS, Toulouse (FR)

( * ) Notice: Subject to any disclaimer, the term of this patent is extended or adjusted under 35 U.S.C. 154(b) by 518 days.

(21) Appl. No.: 12/422,451

(22) Filed: Apr. 13, 2009

(65) Prior Publication Data

US 2009/0259351 A1    Oct. 15, 2009

(30) Foreign Application Priority Data

Apr. 14, 2008  (FR) ..................... 08 02038

(51) Int. Cl.
   *G05D 1/08* (2006.01)
(52) U.S. Cl. .......................... 701/7; 701/121
(58) Field of Classification Search ............... 701/7, 121
   See application file for complete search history.

(56) References Cited

U.S. PATENT DOCUMENTS

| | | | |
|---|---|---|---|
| 5,051,910 A | | 9/1991 | Liden |
| 6,507,782 B1 * | | 1/2003 | Rumbo et al. ................. 701/121 |
| 7,502,684 B2 * | | 3/2009 | Haas ............................ 701/121 |
| 2004/0183699 A1 | | 9/2004 | Vialleton |
| 2005/0143904 A1 * | | 6/2005 | Haas ............................ 701/120 |
| 2006/0265110 A1 | | 11/2006 | Ferro |
| 2007/0288130 A1 * | | 12/2007 | Lemoult et al. ................. 701/14 |
| 2008/0103646 A1 * | | 5/2008 | Lucas et al. ..................... 701/14 |
| 2008/0172149 A1 * | | 7/2008 | Rouquette et al. ............... 701/16 |
| 2008/0243315 A1 * | | 10/2008 | Ferro ................................ 701/7 |
| 2008/0243318 A1 * | | 10/2008 | Ferro et al. ..................... 701/11 |

FOREIGN PATENT DOCUMENTS

| EP | 1 460 385 | 9/2004 |
|---|---|---|
| FR | 2 888 636 | 1/2007 |

OTHER PUBLICATIONS

Preliminary Search Report dated Nov. 20, 2008 w/English translation.

D. De Smedt et al., "Study of the required time of arrival function of current FMS in an ATM context," Digital Avionics Systems Conference, 2007. DASC '07. IEEE/AIAA 26 th, IEEE, PI, Oct. 1, 2007, pp. 1.0.5-1, XP031166284.

\* cited by examiner

*Primary Examiner* — James Trammell
*Assistant Examiner* — Truc M Do
(74) *Attorney, Agent, or Firm* — Dickinson Wright PLLC

(57) ABSTRACT

Disclosed is a method and device of guiding an aircraft along a flight trajectory to comply with a time constraint for arriving at a required arrival time at a waypoint of the flight trajectory. Speed setpoints are determined according to a speed profile that complies with the required arrival time at the waypoint, based on estimated values of parameters relating to the flight of the aircraft, and by taking account of an upper limit for a maximum speed at which the aircraft flies along the flight trajectory. The determined speed setpoints are applied to the aircraft during guidance of the aircraft along the flight trajectory.

8 Claims, 4 Drawing Sheets

METHOD AND DEVICE FOR GUIDING AN AIRCRAFT

FIELD OF THE INVENTION

The present invention relates to a method and a device for guiding an aircraft, which flies along a flight trajectory and which must comply with a time constraint.

BACKGROUND OF THE INVENTION

Within the framework of the present invention, it is considered that a time constraint is a constraint which requires a given arrival time, of RTA ("Required Time of Arrival") type, at a particular waypoint of the flight trajectory followed by the aircraft.

Although not exclusively, the present invention can be applied in particular to the guidance of aircraft, such as in particular civilian transport airplanes, during an airport landing phase. It is known that such a landing phase is generally monitored and managed by air traffic controllers. One of the tasks of an air traffic controller is to ensure compliance, at a particular point of convergence in space, with a sequence of arrival times for the various aircraft converging towards this particular point, onward of which the final part of the landing is carried out.

A device for aiding the approach, with a view to a landing, is known from document FR-2 888 636. This device is mounted on an aircraft and uses a standard flight management system and standard guidance system.

During a flight requiring compliance with a time constraint, the following operations are generally carried out:
a) at least one time constraint of RTA type, which relates to a required arrival time at a particular waypoint, is entered into an onboard flight management system by an operator;
b) the values of parameters relating to the flight of the aircraft, such as the wind or the temperature for example, are determined;
c) guidance setpoints comprising speed setpoints which make it possible to guide the aircraft so that it arrives at said particular waypoint at said required arrival time, generally by following the flight trajectory initially envisaged, are determined with the aid of said values and of said time constraint; and
d) these guidance setpoints are applied to the aircraft.

The entry of an RTA time constraint relating to a particular waypoint into a flight management system, of FMS ("Flight Management System") type for example, which makes it possible to fly the aircraft along a trajectory which is generally optimized in terms of parameters of the aircraft, exhibits drawbacks.

In particular, the flight management system does not anticipate the fact that the parameters (for example the wind, the temperature or the position of the aircraft) taken into account in the calculation of the guidance setpoints may be very unreliable. These parameters which are generally entered into the flight management system by an operator may be significantly different from the real parameters which will be encountered by the aircraft from its current position up to said waypoint. In particular, as regards wind and temperature, the difference between the values entered and the real values may be fairly considerable, mainly because of the poor accuracy of the weather data relating to wind and temperature, which are transmitted to the crew.

Furthermore, in the aforementioned step c), said speed setpoints are determined by taking account at least of an upper limit for the speed, which illustrates the maximum speed at which the aircraft is authorized to fly along the flight trajectory. So, to satisfy an entered time constraint, the flight management system determines, as speed setpoints, the speeds necessary in order to reach said particular waypoint at said given arrival time, without overstepping said upper speed limit (or maximum speed). Nevertheless, if necessary, the flight management system may be led to determine speed setpoints which correspond to said upper limit. Now, in such a situation, as the aircraft then follows the speed setpoints at its authorized maximum speed, it is impossible for it to accelerate further, should this prove to be necessary in the course of the flight. Thus, for example, if a headwind encountered by the aircraft is greater than the wind value used in the predictions, in particular because of an error in estimating the wind or because of the appearance of an unexpected headwind, so that an acceleration of the aircraft is necessary in order to be able to comply with the time constraint, said aircraft is not able to fly faster (since it is already flying at the maximum speed), and it is therefore not able to comply with the speed constraint.

In the same manner, in the aforementioned step c), said speed setpoints can be determined by also taking account of a lower limit for the speed, which illustrates the minimum speed at which the aircraft is authorized to fly along the flight trajectory. So, to satisfy an entered time constraint, the flight management system determines, as speed setpoints, the speeds necessary to reach said particular waypoint at said given arrival time, without overstepping said lower speed limit (or minimum speed). Nevertheless, if necessary, the management system may be led to determine speed setpoints which correspond to said lower limit. Now, in such a situation, as the aircraft then follows the speed setpoints at its authorized minimum speed, it is impossible for it to decelerate further, should this prove to be necessary in the course of the flight. Thus, for example, if a tailwind encountered by the aircraft is greater than the wind value used in the predictions, in particular because of an error in estimating the wind or because of the appearance of an unexpected tailwind, so that a deceleration of the aircraft is necessary in order to be able to comply with the time constraint, said aircraft is not able to fly slower (since it is already flying at the minimum speed), and it is therefore not able to comply with the speed constraint.

The aforementioned situations may be encountered, not only in the event of an error in the wind value used, but also in the event of an error in the temperature value used or in the event of an aircraft guidance error when the speed at which the aircraft is actually flying is different from the predicted speed used in the calculations.

The aforementioned standard guidance of an aircraft, with the aim of complying with a time constraint, is therefore not completely satisfactory.

SUMMARY OF THE INVENTION

The object of the present invention is to remedy the aforementioned drawbacks. It relates to a particularly robust and reliable method of guiding an aircraft flying along a flight trajectory, which must comply with a time constraint requiring a given arrival time at a particular waypoint of said flight trajectory.

For this purpose, according to the invention, said method according to which, in the course of the flight:
A/ speed setpoints are determined which are defined in the form of a speed profile that the aircraft must comply with during the flight along said flight trajectory so as to arrive at said waypoint at said required arrival time, said speed setpoints being determined by taking account at least of an upper limit for the speed which illustrates the maximum speed at which the aircraft can fly along said flight trajectory; and B/ during the guidance of the aircraft along said flight trajectory, said speed setpoints are applied to the aircraft, is noteworthy in that, in the course of the flight, in step A/:

a) a current stretch is determined which depends on the current position of the aircraft and which corresponds to a stretch of the flight trajectory, comprising at least one part of the flight trajectory ahead of the current position of the aircraft, said current stretch being directly followed by a distant stretch which is defined along said flight trajectory at least up to said waypoint;

b) a first speed margin is determined for the maximum speed of the aircraft along said distant stretch and an auxiliary upper limit which is lower (by this first speed margin) than said upper limit for said distant stretch is formed with the aid of this first speed margin; and c) said speed setpoints are determined by taking account:
of said upper limit for said current stretch; and
of said auxiliary upper limit for said distant stretch.

Moreover, preferably:
in step b), a second speed margin is determined for the minimum speed of the aircraft along said distant stretch and an auxiliary lower limit which is higher (by this second speed margin) than a (standard) lower limit for said distant stretch is formed with the aid of this second speed margin, said lower limit illustrating the minimum speed at which the aircraft can fly along said flight trajectory; and in step c), said speed setpoints are determined by taking account:
of said lower limit for said current stretch; and
of said auxiliary lower limit for said distant stretch.

On said current stretch, said standard upper and/or lower limits are preserved, not only for the prediction, that is to say for the determination of the speed setpoints (previous step A/), but also for the guidance of the aircraft in step B which follows.

Thus, by virtue of the invention, outside of said current stretch specified hereinbelow, that is to say on said distant stretch (which is distant from the current position of the aircraft), the prediction of speed setpoints is carried out by taking into account an auxiliary upper limit which is lower by a first speed margin than the standard upper limit (and optionally an auxiliary lower limit which is higher by a second speed margin than the standard lower limit), thereby making it possible to avoid premature saturation of the envisaged speed (on said distant stretch) of the aircraft at the authorized maximum speed (or at the authorized minimum speed). This thus prevents it being necessary, in order to satisfy a time constraint, for the aircraft to have to envisage flying prematurely (namely on said distant stretch) at its authorized maximum speed, that is to say of not envisaging any margin to the acceleration, should time need to be gained. Thus, by virtue of this speed margin or these speed margins, it is made possible to correct, if appropriate, estimation errors which represent errors in the estimated values used, by making the aircraft perform an additional acceleration (or deceleration). A particularly reliable and robust guidance method is therefore obtained.

In particular, these estimation errors may be:
wind errors corresponding to a difference between the wind value used to determine the speed setpoints and the wind actually existing during the flight of the aircraft;

temperature errors corresponding to a difference between the temperature value used to determine the speed setpoints and the temperature actually existing during the flight of the aircraft; and guidance errors corresponding to a difference between the predicted speed at which the aircraft is guided and the effective flight speed.

Additionally, advantageously, in step A/:

α) account is taken of a speed profile, which comprises:
at least one speed which is lower than said limit value, for said current stretch of the flight trajectory; and
at least one speed which is lower than said auxiliary limit value, for said distant stretch of the flight trajectory;

β) an estimated arrival time at said waypoint is determined with the aid of said speed profile and of values of parameters relating to the flight of the aircraft;

γ) the difference between this estimated arrival time and said required arrival time is calculated and this difference is compared with a threshold value; and δ) as a function of this comparison:
if said difference is less than or equal to said threshold value, said speed profile is preserved; and
if said difference is greater than said threshold value, a new speed profile is chosen and the previous operations α) to δ) are repeated using this new speed profile, said operations α) to δ) being repeated until the difference obtained in step γ) becomes less than or equal to said threshold value.

In a first embodiment, in an advantageous manner, in the aforementioned step A/a), said current stretch represents a stretch of the flight trajectory, which starts at the current position of the aircraft and which is defined following a predetermined distance, for example 200 nautical miles (about 370 kilometers).

Furthermore, in a second embodiment, for which the flight trajectory is formed of a series of successive segments connected together at waypoints, in an advantageous manner, said current stretch corresponds to the current segment of the flight trajectory, that is to say to the segment which is currently followed by the aircraft.

Additionally, in an advantageous manner, upon a change of speed at the level of the speed profile, between a first speed and a second speed, said speed profile exhibits a transient phase corresponding to a gradual progression from said first speed to said second speed, thereby making it possible to obtain a gentle transition from one speed to another, which does not disturb in particular the comfort of the passengers.

Additionally, in a first embodiment, in step B/, during the guidance of the aircraft, the speed of the aircraft is adjusted (if necessary) over the whole of the flight trajectory ahead of the aircraft.

Furthermore, in a second embodiment, in step B/, during the guidance of the aircraft, the speed of the aircraft is adjusted solely on said current stretch. In this second embodiment, provision may also be made, when it is not possible to adjust the speed of the aircraft on said current stretch in order to completely comply with the time constraint, for it to be possible to adjust said speed outside of said current stretch, that is to say also at least on a part of said distant stretch.

The present invention also relates to a device for guiding an aircraft, in particular a transport airplane, flying along a flight trajectory and having to comply with a time constraint requiring a given arrival time at a particular waypoint of said flight trajectory.

According to the invention, said device of the type comprising:
- a flight management system which determines speed setpoints which are defined in the form of a speed profile that the aircraft must comply with during the flight along said flight trajectory so as to arrive at said waypoint at said required arrival time, said speed setpoints being determined by taking account at least of an upper limit for the speed which illustrates the maximum speed at which the aircraft can fly along said flight trajectory; and
- a guidance system which guides the aircraft along said flight trajectory, by applying in particular said speed setpoints to it, is noteworthy in that said flight management system comprises:
- first means for determining a current stretch which depends on the current position of the aircraft and which corresponds to a stretch of the flight trajectory, comprising at least one part of the flight trajectory ahead of the current position of the aircraft, said current stretch being directly followed by a distant stretch which is defined along said flight trajectory at least up to said waypoint;
- second means for determining a first speed margin for the maximum speed of the aircraft along said distant stretch and for forming, with the aid of this first speed margin, an auxiliary upper limit which is lower than said upper limit for said distant stretch; and
- third means for determining said speed setpoints, by taking account:
  - of said upper limit for said current stretch; and
  - of said auxiliary upper limit for said distant stretch.

Moreover, in an advantageous manner:
- said second means are formed so as to determine, moreover, a second speed margin for the minimum speed of the aircraft along said distant stretch and to form, with the aid of this second speed margin, an auxiliary lower limit which is higher than a lower limit for said distant stretch, said lower limit illustrating the minimum speed at which the aircraft can fly along said flight trajectory; and
- said third means are formed so as to determine said speed setpoints, by also taking account:
  - of said lower limit for said current stretch; and
  - of said auxiliary lower limit for said distant stretch.

The figures of the appended drawing will elucidate the manner in which the invention may be embodied. In these figures, identical references designate similar elements.

Figure 1:
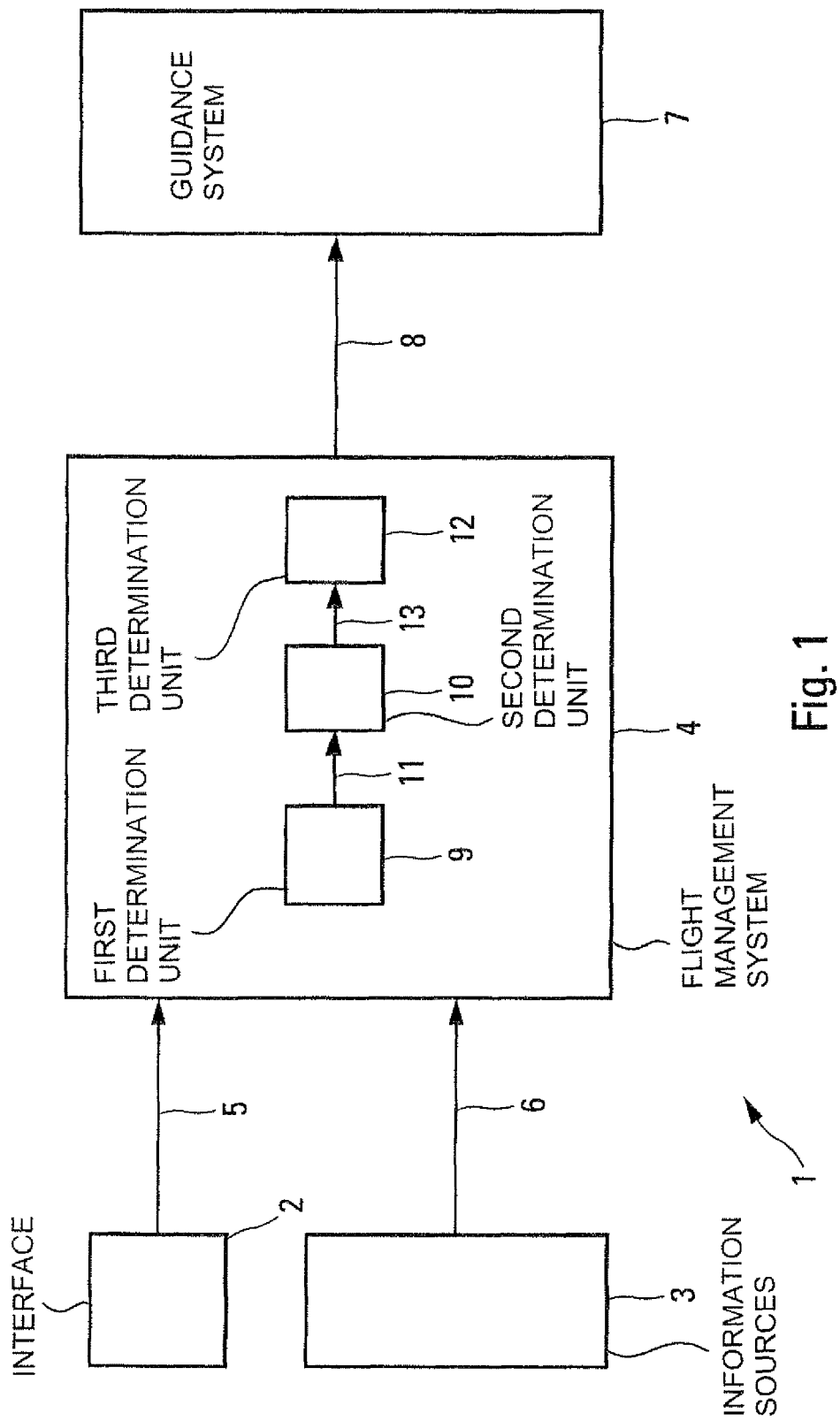
FIG. 1 is the schematic diagram of a device in accordance with the invention.

The device 1 in accordance with the invention and schematically represented in FIG. 1 is intended to guide an aircraft A, in particular a transport airplane (especially civilian), which flies along a standard flight trajectory TV and which must comply with a time constraint. Although not exclusively, the present invention can be applied in particular to the guidance of the aircraft A during an approach phase with a view to a landing at an airport.

DETAILED DESCRIPTION OF THE INVENTION

Within the framework of the present invention, to comply with a time constraint, the aircraft A must arrive at a given arrival time, of RTA type ("Required Time of Arrival"), at a particular waypoint Pp of the flight trajectory TV followed.

Accordingly, said guidance device 1 comprises:
- interface means 2 which allow a crew member of the aircraft A to enter the values of parameters (relating to the flight of the aircraft A) into said device 1, and in particular a temperature value and/or a wind value. These interface means 2 comprise standard means such as, for example, a keyboard and/or designation means, associated with a screen;
- a set 3 of information sources which determine, in a standard manner, in real time, the values of flight parameters of the aircraft A, and in particular its current position PC;
- a flight management system 4, for example of FMS ("Flight Management System") type, which is connected by way of links 5 and 6 respectively to said interface means 2 and to said set 3 and which is formed so as to determine guidance setpoints of the aircraft A comprising speed setpoints. These speed setpoints are defined in the form of a speed profile PV that the aircraft A must comply with during the flight along said flight trajectory TV, so as to arrive at a waypoint Pp at a required arrival time (in accordance with a time constraint). Said speed profile PV illustrates an evolution of the speed during the flight along the flight trajectory TV. Said speed setpoints are determined by taking account of an upper limit Lsup for the speed, which illustrates the maximum speed (which may be variable) at which the aircraft A can fly along said flight trajectory TV. This maximum speed can correspond to a standard speed of VMO/MMO type, with VMO ("Velocity Maximum Operating") the maximum operational speed, and MMO ("Maximum Operating Mach Number") the maximum operational Mach; and
- a standard guidance system 7 which is connected by way of a link 8 to said flight management system 4 and which is intended to guide the aircraft A along the flight trajectory TV, by applying to it in a standard manner guidance setpoints received from said management system 4, and in particular said speed setpoints which have been determined by said flight management system 4.

Figure 2:
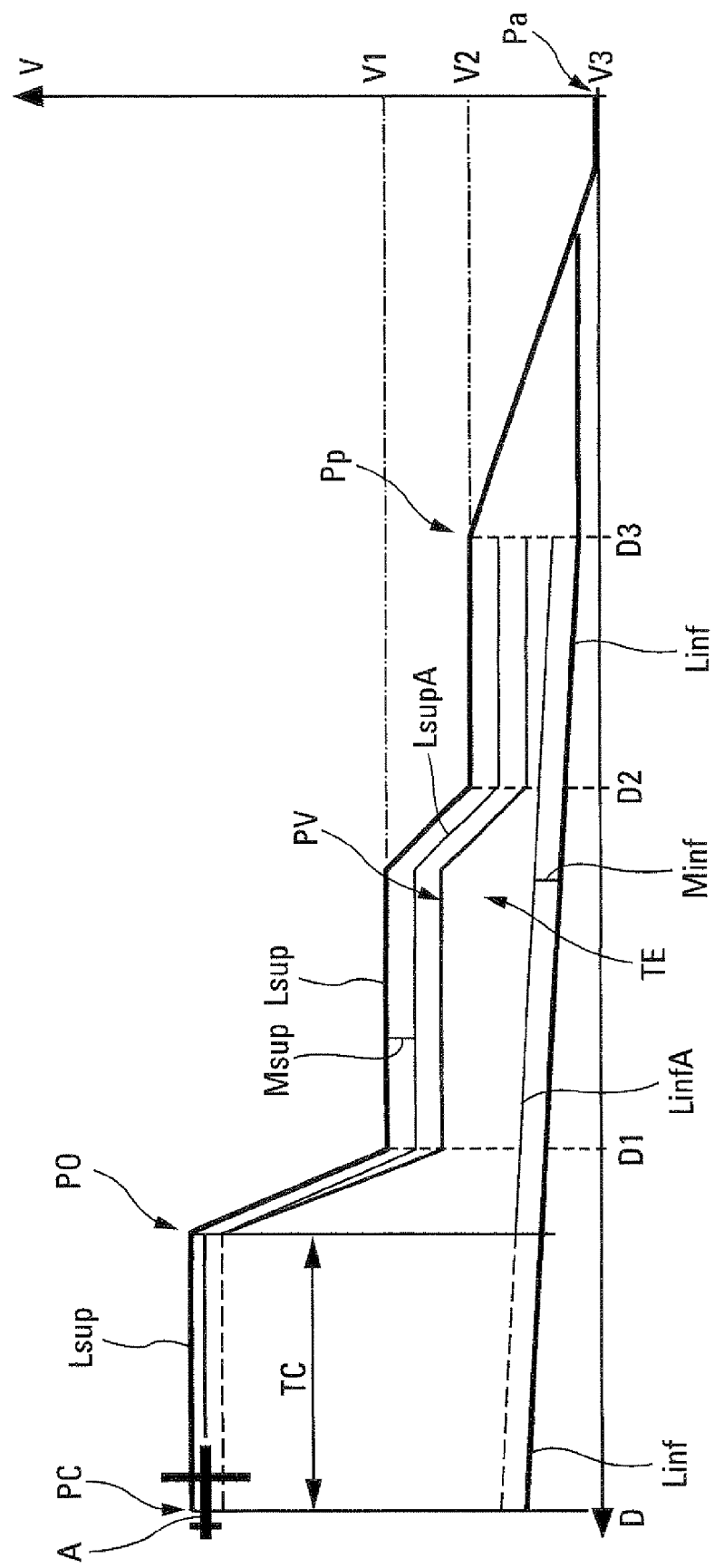
FIG. 2 illustrates an exemplary speed profile generated by a device in accordance with the present invention.

According to the invention, said flight management system 4 comprises in particular:
- an element 9 for determining a current stretch TC which depends on the current position PC of the aircraft A and which corresponds to a stretch of the flight trajectory TV, comprising at least one part of the flight trajectory TV ahead of the current (or actual) position PC of the aircraft A, and for determining a distant stretch TE. The current stretch TC is directly followed by the distant stretch TE which is defined along said flight trajectory TV (from the end of said current stretch TC) at least up to said waypoint Pp concerned;
- an element 10 which is connected by way of a link 11 to said element 9 and which is formed so as to determine an auxiliary upper limit LsupA which is lower than said upper limit Lsup, by a speed margin Msup, as represented in FIG. 2. This speed margin Msup is, for example, entered into the device 1 by an operator with the aid of said interface means 2. This auxiliary upper limit LsupA is defined solely for said distant stretch TE; and an element 12 which is connected by way of a link 13 to said element 10 and which is formed so as to determine, in a standard manner, said speed setpoints, by taking account:
  of said upper limit Lsup for said current stretch TC; and
  of said auxiliary upper limit LsupA for said distant stretch TE.

Moreover, in a preferred embodiment:
said element 10 determines, along said distant stretch TE, an auxiliary lower limit LinfA which is higher than a standard lower limit Linf by a value equal to a speed margin Minf. Said lower limit Linf illustrates the minimum speed at which the aircraft A can fly along said flight trajectory TV, as a function of its characteristics and its flight capabilities. Said speed margin Minf, for its part, is for example entered into the device 1 by an operator with the aid of said interface means 2; and
the element 12 determines said speed setpoints, by also taking account:
  of said lower limit Linf for said current stretch TC; and
  of said auxiliary lower limit LinfA for said distant stretch TE.

In this case, the limits Lsup and Linf form an envelope of speeds, and the limits LsupA and LinfA form an auxiliary envelope of speeds.

Consequently, the device 1 in accordance with the invention carries out, outside of said current stretch TC specified hereinbelow, that is to say on said distant stretch TE (which is distant from the current position PC of the aircraft A), the prediction of speed setpoints by taking into account an auxiliary upper limit LsupA which is lower by a speed margin Msup than the standard upper limit Lsup (and optionally an auxiliary lower limit LinfA which is higher by a speed margin Minf than the standard lower limit Linf), thereby making it possible to avoid premature saturation of the envisaged speed (on said distant stretch TE) of the aircraft A at the authorized maximum speed (or at the authorized minimum speed). This thus prevents it being necessary, in order to satisfy a time constraint, for the aircraft A to have to envisage flying prematurely (namely on said distant stretch TE) at its authorized maximum speed, that is to say of not envisaging any margin to the acceleration, should time need to be gained. Thus, by virtue of these speed margins Msup and Minf, the flight management system 4 is able to correct, if appropriate, estimation errors which represent errors in the estimated values used, by making the aircraft A carry out an additional acceleration (or deceleration).

In particular, these estimation errors may be:
wind errors corresponding to a difference between the wind value used to determine the speed setpoints and the wind actually existing during the flight of the aircraft A;
temperature errors corresponding to a difference between the temperature value used to determine the speed setpoints and the temperature actually existing during the flight of the aircraft A; and
guidance errors corresponding to a difference between the predicted speed at which the aircraft A is guided and the effective flight speed.

A particularly reliable and robust guidance device 1 is therefore obtained.

Represented in FIG. 2 is a graph illustrating a speed profile PV determined in accordance with the present invention (by the flight management system 4). This speed profile PV is associated with an approach phase with a view to a landing on a landing runway (not represented). The graph of FIG. 2 comprises a speed scale V along the ordinate and a distance scale D along the abscissa. This distance scale D illustrates the horizontal distance to destination at the moment of landing, that is to say the distance in a horizontal plane up to the point of impact (or of landing) Pa on the landing runway during the landing. Also represented in this graph are:
  the current stretch TC;
  the distant stretch TE which is defined from the downstream end PO of said current stretch TC up to said waypoint Pp which is situated at a distance D3 from the landing point Pa;
  by a thick continuous line, the upper limit Lsup which is defined (in a standard manner) over the whole of the flight trajectory TV remaining between the current position PC of the aircraft A and at least the waypoint Pp;
  the speed margin Msup relating to said upper limit Lsup which is defined solely for the distant stretch TE;
  by a fine continuous line, the auxiliary upper limit LsupA which is defined solely for the distant stretch TE, on the basis of said upper limit Lsup from which said margin Msup has been subtracted. As the limit LsupA is not taken into account on the current stretch TC, a dashed line has been represented on this current stretch TC;
  by a thick continuous line, the lower limit Linf which illustrates the authorized minimum speed of the aircraft A during the flight and which is defined (in a standard manner) over the whole of the flight trajectory TV remaining between the current position PC of the aircraft A and at least the waypoint Pp;
  the speed margin Minf relating to the lower limit Linf, which is defined solely on the distant stretch TE; and
  by a fine continuous line, the auxiliary lower limit LinfA which is defined solely on said distant stretch TE, on the basis of said lower limit Linf to which said speed margin Minf has been added. A dashed line shows that the limit LinfA is not taken into account on the current stretch TC.

By way of illustration, provision may be made that, during an approach phase with a view to a landing, which comprises speed tiers as represented in FIG. 2, the upper limit Lsup exhibits, successively:
  at a distance D1 from the landing point Pa, a speed V1 which is, for example, equal to 250 knots (about 460 km/h);
  at a distance D2 from the landing point Pa, a speed V2 which is, for example, equal to 220 knots (about 400 km/h); and
  onward of a distance D3 from the landing point Pa, a speed which declines gradually from the speed V2 to a speed V3 which represents a standard approach speed.

On the other hand, in the example of FIG. 2, the lower limit Linf exhibits a gradual decline in the speed onward of said current position PC up to said waypoint Pa.

Figure 3:
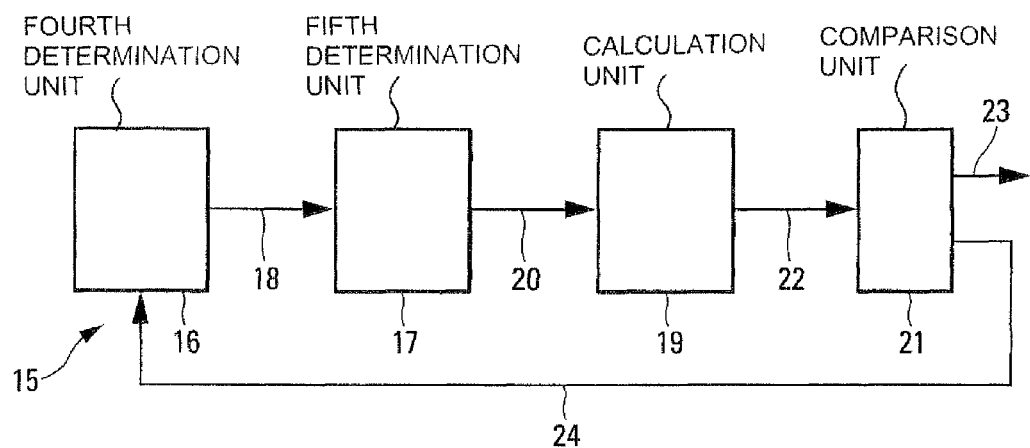
FIG. 3 schematically shows means forming part of a device in accordance with the invention.

Additionally, said flight management system 4 also comprises the set represented in FIG. 3, which comprises:
an element 16 for taking into account a speed profile PV, which comprises:
  at least one speed (which may be variable) which is lower than said limit value Lsup, for said current stretch TC of the flight trajectory TV; and
  at least one speed (which may be variable) which is lower than said auxiliary limit value LsupA, for said distant stretch TE of the flight trajectory TV;
an element 17 which is connected by way of a link 18 to said element 16 and which is formed so as to determine an estimated arrival time ETA ("Estimated Time of Arrival"), at said waypoint Pp, with the aid of said speed profile PV and of values of parameters relating to the flight of the aircraft A, received from said means 2 and from said set 3 for example;

an element 19 which is connected by way of a link 20 to said element 17 and which is formed so as to calculate the difference between this estimated arrival time ETA and said required arrival time RTA (which is for example entered by a pilot with the aid of the means 2); and an element 21 which is connected by way of a link 22 to said element 19 and which compares this difference with a predetermined threshold value, for example 30 seconds. This threshold value can be entered by an operator, in particular a pilot, with the aid of the means 2. As a function of this comparison, said element 21:

transmits said speed profile by way of a link 23 as speed setpoint, if said difference is less than or equal to said threshold value;

otherwise, chooses a new speed profile and transmits it by way of a link 24 to said element 16 (or asks said element 16 to choose a new speed profile), so that the elements 16, 17, 19 and 21 repeat the previous operations, doing so until the difference between the new estimated arrival time ETA and the required arrival time RTA becomes less than or equal to said threshold value.

In a preferred embodiment, said flight management system 4 uses, to carry out its predictions, a criterion which may be representative, for a civilian transport airplane, of the strategy of the airline for the level of speeds that the airplane must hold during a flight. This criterion is determined with the aid of a cost index CI which is defined on the basis of the following expression:

$$CI = CC/CT$$

in which;

CC is the cost related to the flight time (servicing, crew, etc.), expressed in kg/min; and CT is the cost of the fuel, expressed in $/kg.

Additionally, upon a change of speed at the level of the speed profile PV (between a first speed and a second speed), the flight management system 4 makes provision on said speed profile PV for a transient phase which corresponds to a gradual progression from said first speed to said second speed, thereby making it possible to obtain a gentle transition from one speed to another, which does not disturb in particular the comfort of the passengers of the aircraft A.

Figure 4:
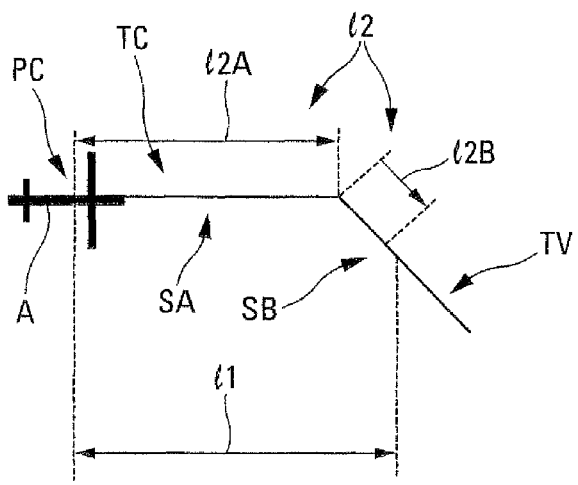
FIG. 4 schematically illustrates the determination of a current stretch, in accordance with a first embodiment.

In a first embodiment represented in FIG. 4, said current stretch TC represents a stretch of the flight trajectory TV which starts at the current position PC of the aircraft A and which is defined according to a predetermined distance l1, l2, for example 200 nautical miles (about 370 kilometers), ahead of the aircraft A. In a first variant, this distance l1 is simply the distance ahead of the aircraft A. In a second variant, a distance l2 along the flight trajectory TV is envisaged. In this case, the distance l2 is determined along the various successive segments SA, SB of the flight trajectory TV such that, for the example of FIG. 4;

$$l2 = l2A + l2B.$$

Figure 5A:
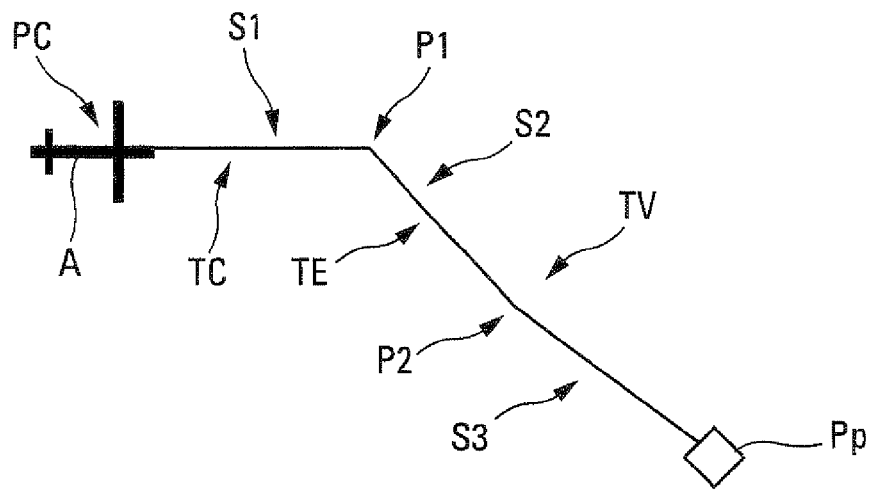
FIGS. 5A, 5B and 5C illustrate a flight of an aircraft furnished with a device in accordance with the invention, using a current stretch which is in accordance with a second embodiment.
Figure 5B:
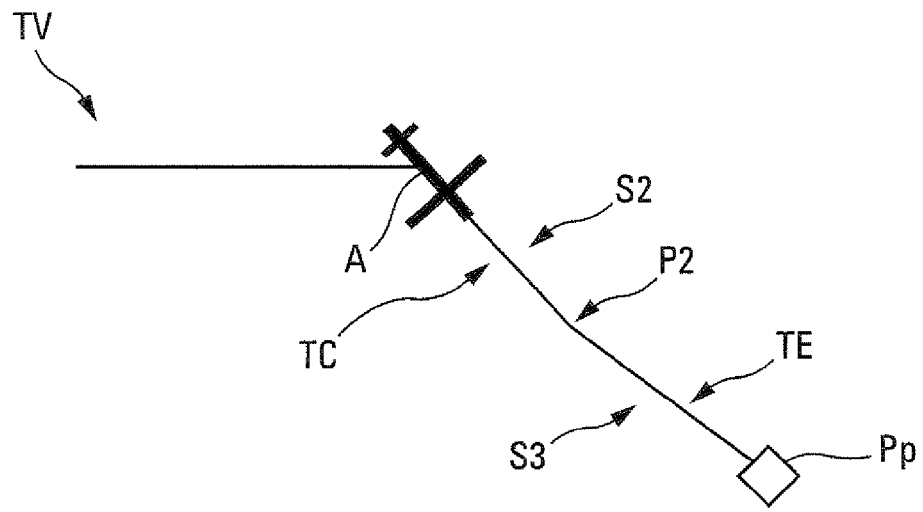
Figure 5C:
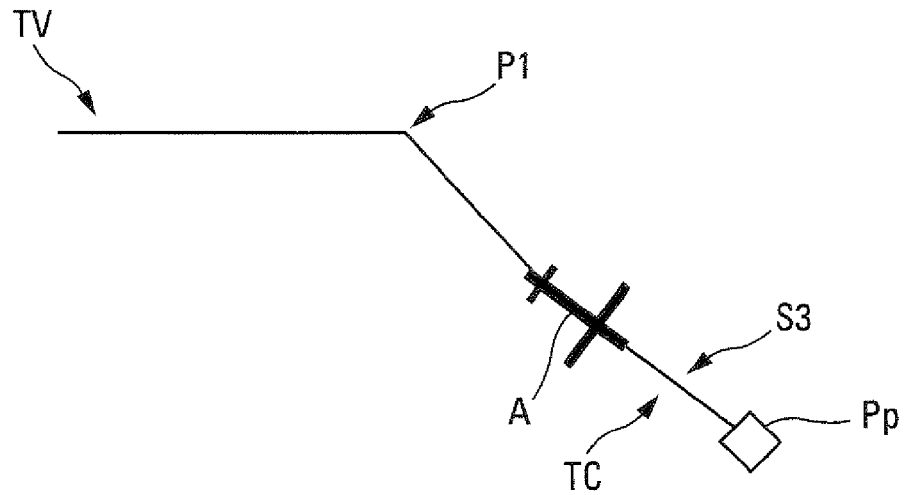

Furthermore, a second embodiment which is represented in FIGS. 5A, 5B and 5C is associated with a flight trajectory TV comprising a series of successive segments S1, S2 and S3, rectilinear segments in particular, which are connected together at waypoints P1, P2. In this second embodiment, the current stretch TC corresponds to the segment of the flight trajectory TV which is currently followed by the aircraft A, for example the segment S1 for the situation of FIG. 5A. Of course, if the aircraft A is not offset laterally with respect to the flight trajectory TV, its current position PC is situated directly on said current stretch TC, as is the case in the examples of FIGS. 5A, 5B and 5C.

These FIGS. 5A, 5B and 5C illustrate the flight of an aircraft A which is guided by the device 1 in accordance with the invention, along a flight trajectory TV, up to a waypoint Pp.

In the situation of FIG. 5, to begin with, the aircraft A flies according to a speed profile which is such that;

on the segment S1, it flies at a speed V1a, the upper limit on this segment S1 being L1;

on the segment S2, it flies at a speed V2a, the upper limit on this segment S2 being L2; and on the segment S3, it flies at a speed V3a, the upper limit on this segment S3 being L3.

If, subsequently, an RTA time constraint is entered by a pilot of the aircraft A, the flight management system 4 recalculates the speed profile PV making it possible to comply with this time constraint. By way of example, if this time constraint demands that the point Pp be reached earlier than initially envisaged, taking it into account therefore necessarily entails increasing the flight speed. According to the new speed profile obtained, the aircraft A must fly:

along the segment S1, at a speed V1b which is higher than V1a, but remains lower than (or equal to) L1;

along the segment S2, at a speed V2b which is higher than V2a, but remains lower than (or equal to) an auxiliary upper limit L2A (lower than L2); and along the segment S3, at a speed V3b which is higher than V3a, but remains lower than (or equal to) an auxiliary upper limit L3A (lower than L3).

If, yet subsequently, an unforeseen (head)wind appears, the estimated time to reach the point Pp will increase. If, moreover, the difference between the estimated arrival time ETA and the required arrival time RTA becomes greater than a threshold value, the flight management system 4 will recalculate the speed profile so that the aircraft A must fly;

along the segment S1, at a speed V1c which is higher than V1b, but is lower than (or equal to) L1;

along the segment S2, at a speed V2c which is higher than V2b, but is lower than (or equal to) the auxiliary upper limit L2A; and along the segment S3, at a speed V3c which is higher than V3b, but is lower than (or equal to) the auxiliary upper limit L3A.

In the situation of FIG. 5B, the segment S2 is the new current stretch TC so that, for the calculation of the predictions:

the speed on this segment S2 must be lower than or equal to L2 (L2A is no longer taken into account); and the speed on the segment S3 (which represents the distant stretch TE) must still be lower than or equal to L3A.

In the situation of FIG. 5C, the segment S3 is the new current stretch TC so that, for the calculation of the predictions (and the guidance), the speed on this segment S2 must be lower than or equal to L3 (L3A is no longer taken into account).

The situations of the previous FIGS. 5A, 5B and 5C which take account of upper limits can be adapted, by analogy, to lower limits.

It will be noted that, preferably, the speed adjustment implemented by the guidance system 7 is such that the speeds are not fixed outside of the current stretch TC, that is to say at the level of said distant stretch TE.

As a variant, provision may nevertheless be made, during the guidance of the aircraft A, for the guidance system 7 to adjust the speed of the aircraft A solely on said current stretch TC. In this variant embodiment, when it is not possible, in a particular situation, to adjust the speed of the aircraft A on said current stretch TC so as to completely comply with the time constraint, provision may nevertheless also be made for it to be possible to adjust said speed (solely in this particular situation) outside of said current stretch TC, that is to say also at least partially on at least one part of said distant stretch TE.

The invention claimed is:

1. A method of guiding an aircraft along a flight trajectory to comply with a time constraint for arriving at a required arrival time at a waypoint of said flight trajectory, comprising the steps of:
   A/ determining speed setpoints according to a speed profile that complies with the required arrival time at said waypoint based on estimated values of parameters relating to the flight of the aircraft, said speed setpoints being further determined by taking account of an upper limit for a maximum speed at which the aircraft flies along said flight trajectory (TV); and
   B/ applying the determined speed setpoints to the aircraft during guidance of the aircraft along said flight trajectory,
   wherein, in the course of the flight, in step A/:
   a) a current stretch is determined which depends on a current position of the aircraft and which corresponds to a stretch of the flight trajectory, comprising at least one part of the flight trajectory ahead of the current position of the aircraft, said current stretch being directly followed by a distant stretch which is defined along said flight trajectory at least up to said waypoint,
   wherein, in the course of the flight, in step A/, to implement predictions of speed setpoints, the following steps are further carried out:
   b) determining a first speed margin for the maximum speed of the aircraft along said distant stretch and an auxiliary upper limit, which is lower than said upper limit for said distant stretch, with the aid of the first speed margin; and
   c) determining the following:
   speed setpoints for said current stretch, by taking account of said upper limit, said speed setpoints relating to a guidance prediction for the guidance of the aircraft in step B/; and
   speed setpoints for said distant stretch, by taking account of said auxiliary upper limit to correct errors in the estimated values of parameters relating to the flight of the aircraft,
   wherein:
   in step b), a second speed margin is determined for the minimum speed of the aircraft along said distant stretch and an auxiliary lower limit, which is higher than a lower limit for said distant stretch, and with the aid of the second speed margin, said lower limit representing a minimum speed at which the aircraft can fly along said flight trajectory; and
   in step c), the following are further determined:
   speed setpoints for said current stretch are determined by taking account of said lower limit, said speed setpoints relating to the guidance prediction for the guidance of the aircraft in step B/; and
   speed setpoints for said distant stretch are determined by taking account of said auxiliary lower limit to correct errors in the estimated values of parameters relating to the flight of the aircraft.

2. A method of guiding an aircraft along a flight trajectory to comply with a time constraint for arriving at an arrival time at a waypoint of said flight trajectory, comprising the steps of:
   A/ determining speed setpoints according to a speed profile that complies with the required arrival time at said waypoint, based on estimated values of parameters relating to the flight of the aircraft, said speed setpoints being further determined by taking account of an upper limit for a maximum speed at which the aircraft flies along said flight trajectory; and
   B/ applying the determined speed setpoints to the aircraft during guidance of the aircraft along said flight trajectory,
   wherein, in the course of the flight, in step A/:
   a) a current stretch is determined which depends on a current position of the aircraft and which corresponds to a stretch of the flight trajectory, comprising at least one part of the flight trajectory ahead of the current position of the aircraft, said current stretch being directly followed by a distant stretch which is defined along said flight trajectory up to said waypoint,
   wherein, in the course of the flight, in step A/, to implement predictions of speed setpoints, the following steps are further carried out:
   b) determining a first speed margin for the maximum speed of the aircraft along said distant stretch and an auxiliary upper limit, which is lower than said upper limit for said distant stretch, with the aid of the first speed margin; and
   c) determining the following:
   speed setpoints for said current stretch, by taking account of said upper limit, said speed setpoints relating to a guidance prediction for the guidance of the aircraft in step B/; and
   speed setpoints for said distant stretch, by taking account of said auxiliary upper limit to correct errors in the estimated values of parameters relating to the flight of the aircraft, wherein in step A/:
   α) account is taken of a speed profile (PV), which comprises:
   at least one speed, which is lower than said limit value, for said current stretch of the flight trajectory; and
   at least one speed which is lower than said auxiliary limit value, for said distant stretch (TE) of the flight trajectory (TV));
   β) an estimated arrival time at said waypoint is determined with the aid of said speed profile and of values of parameters relating to the flight of the aircraft;
   γ) a difference between the estimated arrival time and said required arrival time is calculated and the difference is compared with a threshold value; and
   δ) as a function of the comparison:
   said speed profile is preserved when said difference is less than or equal to said threshold value; and
   when said difference is greater than said threshold value, a new speed profile is chosen and the previous steps α) to δ) are repeated using the new speed profile, said step α) to δ) being repeated until the difference obtained in step γ) becomes less than or equal to said threshold value.

3. The method as claimed in claim 1,
   wherein in step A/a), said current stretch represents a stretch of the flight trajectory, which starts at the current position of the aircraft and which is defined following a predetermined distance.

4. The method as claimed in claim 1,
   wherein said flight trajectory is formed of a series of successive segments connected together at waypoints, and wherein said current stretch corresponds to the segment of the flight trajectory, which is currently followed by the aircraft.

5. The method as claimed in claim 1,
wherein, upon a change of speed from a first speed to a second speed, said speed profile exhibits a transient phase corresponding to a gradual progression from said first speed to said second speed.

6. The method as claimed in claim 1,
wherein in step B/, during the guidance of the aircraft, the speed of the aircraft is adjusted over the whole of the flight trajectory ahead of the aircraft.

7. The method as claimed in claim 1,
wherein in step B/, during the guidance of the aircraft, the speed of the aircraft (A) is adjusted solely on said current stretch.

8. A device for guiding an aircraft along a flight trajectory to comply with a time constraint for arriving at a required arrival time at a waypoint of said flight trajectory, said device comprising:

a flight management system which determines, based on estimated values of parameters relating to the flight of the aircraft, speed setpoints according to a speed profile that complies with the required arrival time at said waypoint, said speed setpoints being determined by taking account of an upper limit for a maximum speed at which the aircraft flies along said flight trajectory, said flight management system comprising first determination unit that determines a current stretch which depends on a current position of the aircraft and which corresponds to a stretch of the flight trajectory, comprising at least one part of the flight trajectory ahead of the current position of the aircraft, said current stretch being directly followed by a distant stretch which is defined along said flight trajectory up to said waypoint; and a guidance system which guides the aircraft along said flight trajectory, by applying speed setpoints, wherein said flight management system further comprises:

second unit that determines a first speed margin for the maximum speed of the aircraft along said distant stretch and, with the aid of the first speed margin, an auxiliary upper limit, which is lower than said upper limit for said distant stretch; and third unit that determines speed setpoints for said current stretch, by taking account of said upper limit, said speed setpoints relating to a guidance prediction for the guidance of the aircraft; and speed setpoints for said distant stretch, by taking account of said auxiliary upper limit to correct errors in the estimated values of parameters relating to the flight of the aircraft wherein:

said second unit further determines a second speed margin for a minimum speed of the aircraft along said distant stretch and, with the aid of the second speed margin, an auxiliary lower limit, which is higher than a lower limit for said distant stretch, said lower limit representing the minimum speed at which the aircraft flies along said flight trajectory; and said third unit further determines:

speed setpoints for said current stretch by taking account of said lower limit, said speed setpoints relating to the guidance prediction for the guidance of the aircraft; and speed setpoints for said distant stretch by taking account of said auxiliary lower limit to correct errors in the estimated values of parameters relating to the flight of the aircraft.

* * * * *